(12) United States Patent
Holm

(10) Patent No.: US 7,336,563 B2
(45) Date of Patent: Feb. 26, 2008

(54) METHOD AND SYSTEM FOR INCREASED UPDATE RATE IN ACOUSTIC POSITIONING

(75) Inventor: Sverre Holm, Asker (NO)

(73) Assignee: Sonitor Technologies AS, Oslo (NO)

( * ) Notice: Subject to any disclaimer, the term of this patent is extended or adjusted under 35 U.S.C. 154(b) by 243 days.

(21) Appl. No.: 11/044,193

(22) Filed: Jan. 28, 2005

(65) Prior Publication Data

US 2005/0232081 A1 Oct. 20, 2005

(30) Foreign Application Priority Data

Jan. 30, 2004 (NO) .................................. 20040440

(51) Int. Cl.
*G01S 3/80* (2006.01)
(52) U.S. Cl. ..................................... 367/118
(58) Field of Classification Search ................ 367/118, 367/127
See application file for complete search history.

(56) References Cited

U.S. PATENT DOCUMENTS

| | | | |
|---|---|---|---|
| 5,119,104 A * | 6/1992 | Heller | 342/450 |
| 5,668,775 A | 9/1997 | Hatteland | 367/127 |
| 5,774,876 A * | 6/1998 | Woolley et al. | 705/28 |
| 5,804,810 A * | 9/1998 | Woolley et al. | 235/492 |
| 5,892,441 A * | 4/1999 | Woolley et al. | 340/539.26 |
| 5,920,287 A | 7/1999 | Belcher | |
| 5,959,568 A * | 9/1999 | Woolley | 342/42 |
| RE36,791 E * | 7/2000 | Heller | 342/450 |

FOREIGN PATENT DOCUMENTS

| NO | 315917 | 10/2003 |
|---|---|---|
| WO | WO 03/087871 | 10/2003 |

OTHER PUBLICATIONS

P. Flikkema, "Spread-spectrum techniques for wireless communication," IEEE Signal Proc. Mag., May 1997.
Freitag et al."Analysis of channel effects on direct-sequence and frequency-hopped spread-spectrum acoustic communication," IEEE Journ. Ocean. Eng., Oct. 2001.
N. M. Vallidis "WHISPER: A Spread Spectrum Approach to Occlusion in Acoustic Tracking", University of North Carolina at Chapel Hill, Department of Computer Science, 2002.
R. Palmer, "A spread spectrum acoustic ranging system—An overview," Proc. 2002 IEEE Canadian Conference on Electrical & Computer Engineering, May 2002.

* cited by examiner

*Primary Examiner*—Daniel Pihulic
(74) *Attorney, Agent, or Firm*—O'Shea, Getz & Kosakowski, P.C.

(57) ABSTRACT

A method for obtaining an increased update rate in an indoor acoustic positioning system for determining the position of one or more identification tags, comprising transmitting from an identification tag an acoustic spread spectrum sequence that is unique to the identification tag, receiving the spread spectrum sequence in a detector unit and recording the arrival time of the spectrum sequence, and comparing the spectrum sequence with stored values of the spectrum sequences used by all the identification tags in the positioning system.

17 Claims, 2 Drawing Sheets

METHOD AND SYSTEM FOR INCREASED UPDATE RATE IN ACOUSTIC POSITIONING

INTRODUCTION/TECHNICAL FIELD

Figure 1:
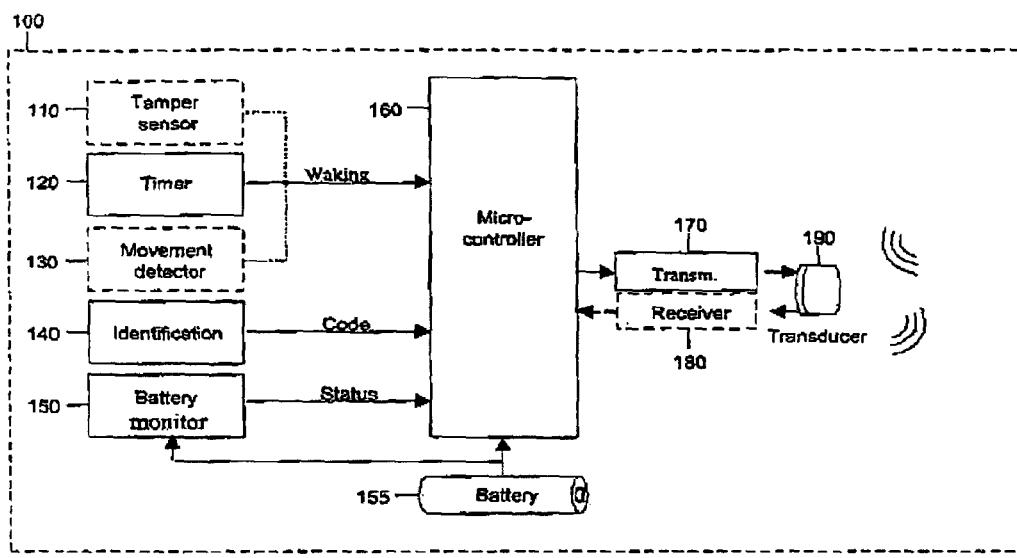

The invention relates to a method and a system for the monitoring and position determination of objects using ultrasound. More specifically, the invention relates to a method and a system for increasing the update rate of the acoustic positioning.

The system comprises a plurality of electronic identification tags which can be attached to the objects that are to be monitored and whose position is to be determined. Each identification tag can transmit a signal with a spread spectrum sequence that is unique to the identification tag.

The system further comprises a plurality of detector units which record and interpret the signals transmitted from the identification tags. The detector units are interconnected in a network connected by signals and send the information received to one or more central processing units for farther processing.

The use of spread spectrums in the signalling between identification tags and detector units has several advantages, but first and foremost it will give an increased capacity for position determination of several moving identification tags.

BACKGROUND OF THE INVENTION

There is an increasing need for accurate position determination in, e.g., applications in the field of virtual/augmented reality and in connection with robot control. Today, various positioning systems based on ultrasound transmitted from identification tags are available for this purpose.

The low value of velocity of sound of 340 m/s means that a system based on ultrasound is limited with regard to how often an acoustic identification tag can transmit a signal and thus have its position updated. This problem is particularly noticeable if there are several identification tags that are to be positioned at the same time since, in addition to position, the identity of each individual identification tag must also be known.

Another problem is that known acoustic positioning systems are relatively sensitive to interference, e. g., the rattling of keys can often cause the system to fail.

The most common way of solving the said problems is to have a secondary channel in addition to a primary acoustic channel. The secondary channel is usually radio waves (RF), but may also be based on infrared light (IR). The extra channel is normally used to prompt one identification tag to transmit a signal. In that way, it is possible to know which identification tag has transmitted via RF/IR and obtain its position via the ultrasonic signal transmitted by the identification tag.

Systems based on a combination of ultrasound and RF/IR require both identification tags and detector units to contain more electronics, which means they will be more complex and consume more power. This may especially be a problem for the identification tags which it is often desirable to make as small as possible since they are to be attached to the different articles whose position is to be determined.

The object of the present invention is to be able to determine the position of several identification tags at the same time, without using more than one communication channel.

PRIOR ART

As mentioned, a number of different systems for locating objects exist, including systems that use ultrasound as signal carrier.

U.S. Pat. No. 315,917 is the Applicant's own patent, and is considered to describe the closest prior art. This system, like the present invention, is designed for the monitoring and position determination of objects by using identification tags that transmit an ultrasonic signal. In the said patent, the ultrasonic signal comprises, a specific ID-code in the form of several different fundamental frequencies. In the system, only one identification tag transmits at a time, and the system is particularly suitable in environments where there is great deal of line noise.

The system is not as suitable for positioning a plurality of identification tags that are moving.

The present invention describes a system that can position many identification tags at the same time by using the technique of spread spectrum.

The use of spread spectrum is common in radio-based communication systems, see, for example, P. Flikkema, "Spread-spectrum techniques for wireless communication," IEEE Signal Proc. Mag., May 1997, and in radio-based navigation systems such as GPS. It is also known from underwater acoustic communication, and for underwater acoustic positioning. Underwater acoustic communication has been described by, among others, L. Freitag, M. Stojanovic, M. Johnson, "Analysis of channel effects on direct-sequence and frequency-hopped spread-spectrum acoustic communication," IEEE Journ. Ocean. Eng., October 2001. Underwater acoustic positioning is described in, inter alia, U.S. Pat. No. 5,668,775 "Methods for determining the position of seismic equipment and applications of the methods". Spread spectrum has also been tried for tracking, e.g., the head, arms and legs of a person. A system of this kind is described by N. M. Vallidis "WHISPER: A Spread Spectrum Approach to Occlusion in Acoustic Tracking", University of North Carolina at Chapel Hill, Department of Computer Science, 2002 (http://www.cs.unc.edu/~tracker/ref/whisper/stewart/whisper-dissertation.pdf). It was based on audible sound and was limited to tracking of only one identification tag.

Another spread spectrum acoustic system based on low-frequency sound at frequencies below 500 Hz has also been proposed for outdoor applications, see R. Palmer, "A spread spectrum acoustic ranging system—An overview," Proc. 2002 IEEE Canadian Conference on Electrical & Computer Engineering, May 2002. What is unique about the method and system according to this invention is that they use non-audible sound, for example, ultrasound in air. No other known systems do this. The systems mentioned above either use an audible/low-frequency acoustic source or are intended for use in media other than air, U.S. Pat. No. 5,668,775 describes a method for determining the position of seismic equipment using the technique of spread spectrum. The position determination takes place whilst the equipment is being towed through the water, at quite large distances and the propagation medium for the acoustic signals is water. The system has thus been developed for an entirely different field of technology/application than the invention, where there are different requirements as regards accuracy and range. Moreover, the system also uses other frequencies and other specifications than. the system and the method according to the invention.

The use of a high-frequency acoustic source means that the system obtains a better resolution and thus better accuracy of the measurements than when lower frequencies are used.

There are several advantages associated with a spread spectrum system. The system will be more robust against noise, as the unique code for each sequence is more robust against noise signals than the short pulse normally used.

A spread spectrum system also has potential for saving power, as transmitted pulse energy is spread over a longer time interval. Although the transmitted energy is the same as before, the peak power will be less. The peak current often determines the dimensions of identification tags in such a system.

A spread spectrum system also has potential for giving a longer range, as a longer pulse means that more energy an be transmitted. This gives a better signal-to-noise ratio in the receiver, with the result that transmissions can be made from a longer distance with the same reliability.

BRIEF DESCRIPTION OF THE INVENTION

The present invention relates to a method and a system for the monitoring and position determination of objects indoors using ultrasound. More specifically, the invention relates to a method and a system for increasing the update rate of the acoustic positioning.

The method for obtaining an increased update rate, according to the invention, comprises:
transmitting from an identification tag a spread spectrum sequence that is unique to the identification tag;
receiving the spread spectrum sequence in a detector unit and recording the arrival time of the spectrum sequence, and comparing the spectrum sequence with stored values of the spectrum sequences that are used by all the identification tags in the positioning system.

The identification tag for use in an acoustic positioning system with increased update rate for determining the position of the identification tag comprises means for transmitting a spread spectrum sequence.

The detector unit for use in the positioning system with increased update rate for determining the position of the identification tag comprises means for recording the arrival time of the spectrum sequence and comparing the spectrum sequence with stored values of the spectrum sequences used by all the identification tags in the positioning system.

The system for obtaining an increased update rate in acoustic positioning comprises:
at least one identification tag that transmits a spread spectrum sequence;
at least one detector unit that detects the spread spectrum sequences and its arrival time;
a network which connects several detector units together by signals; and
at least one central processing unit for collecting and interpreting processed data from the detector units via the network; and
processing means in the central processing unit(s) for determining the position of a specific identification tag.

In a preferred embodiment, the system comprises a plurality of electronic identification tags which can be attached to the objects that are to be monitored and whose position is to be determined. Each identification tag can transmit a signal with a spread spectrum sequence that is unique to the identification tag. The signal is received in a plurality of detector units that record and interpret the signals transmitted from the identification tags. The detector units are interconnected in a network connected by signals and send the information received to one or more central processing units for farther processing.

The use of the technique of spread spectrum in the signalling between identification tags and detector units has several advantages, but first and foremost it will give an increased capacity for position determination of several moving identification tags.

The object of the invention is obtained using a detector unit, a identification tag, and a system and a method as described in the set of claims, and which will be described in more detail below.

LIST OF DRAWINGS

Figure 2:
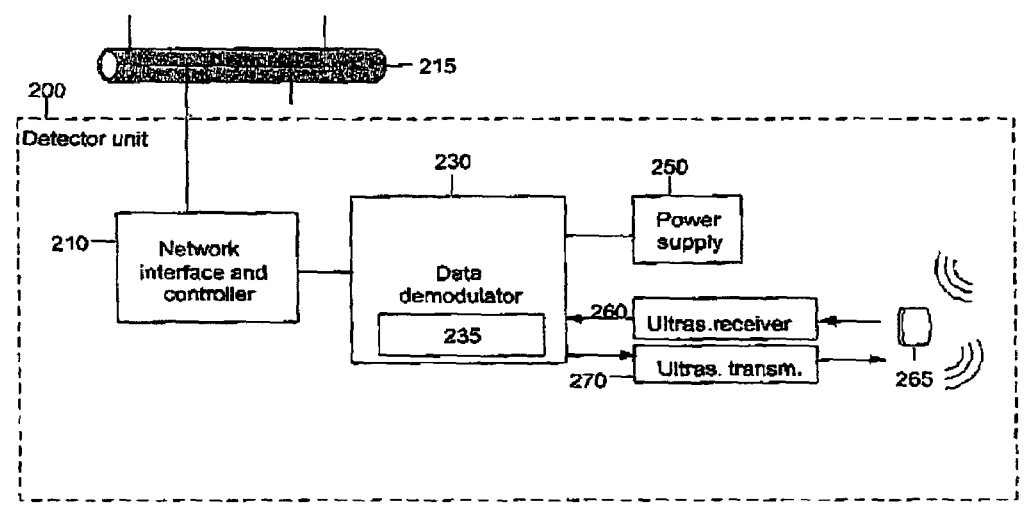
Figure 3:
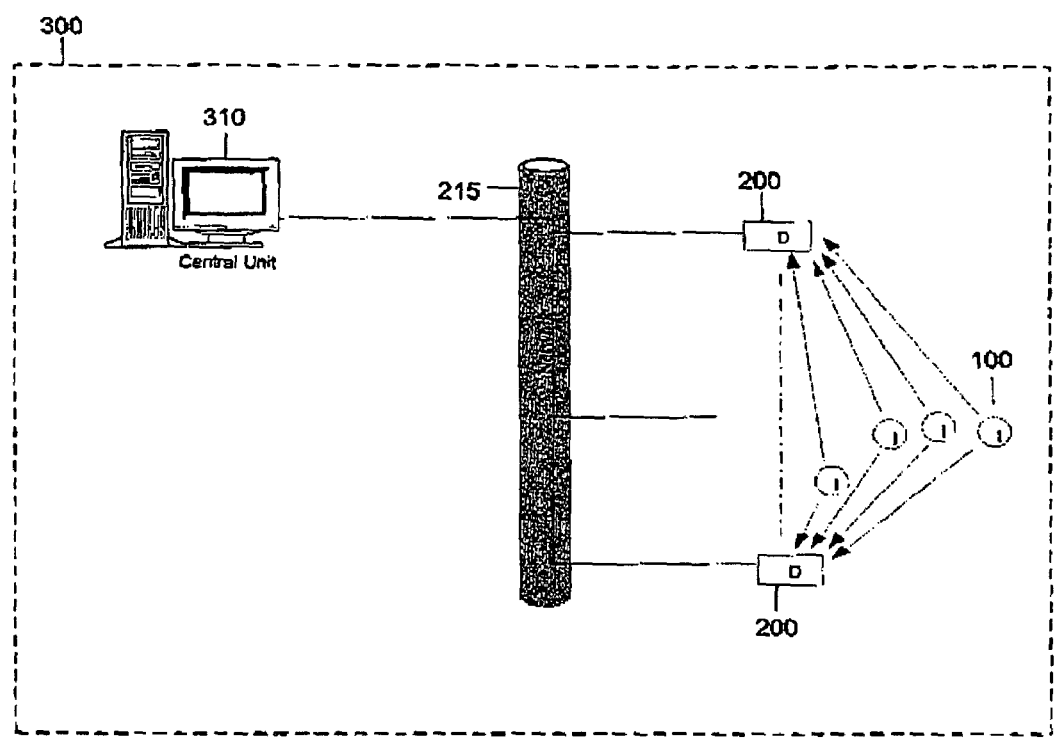

The invention will be further described with reference to the drawings, wherein:
FIG. 1 shows the structure of an identification tag which transmits signals;
FIG. 2 shows the structure of a detector unit;
FIG. 3 shows how the whole system is linked together in a network.

DETAILED DESCRIPTION

The system according to the invention is built up in such a way that it will provide an increased capacity for position determination of several moving identification tags.

FIG. 1 shows the units that typically may be incorporated in each identification tag 100. Each identification tag 100 is a device that may contain a tamper sensor 110, a timer 120, a movement detector 130, an identification module 140, a battery monitor 150, a data input/output controller 160 (microcontroller), a transmitter 170 and a receiver 180 that transmits ultrasonic raves with the aid of a transducer 190. The whole device is supplied with power from a battery 155. The units are incorporated in an identification tag 100 which can be attached to the object that is to be monitored. The identification tag 100 may contain all of or only some of the units.

For transmission of signals, the identification tag 100 comprises a transmitter 170 and an ultrasonic transducer 190 adapted for transmitting a signal with a spread spectrum sequence, and a control unit in the form of a microcontroller 160 for controlling the signal transmission. Each identification tag 100 has a spectrum sequence which is almost orthogonal to the spectrum sequence of other identification tags 100. The form of the spectrum sequence is defined in the identification module 140.

The microcontroller 160 may be connected to a movement detector 130 and a tamper sensor 110 in order to activate the ultrasonic transducer 190 so that it initiates transmission of signals if an attempt is made to remove and/or open the identification tag 100.

The identification tags 100 may also contain means for responding to calls from one detector unit 200 (FIG. 2), whilst the task of the transmitter is to transmit the unique spread spectrum sequence belonging to the identification tag 100. The transmission can be made at the prompt of the detector unit 200, at predetermined intervals, in the event of tampering and/or when the object starts to move.

FIG. 2 shows the units that typically may be incorporated in a detector unit 200. One or more detector units 200 may be placed in the room or area in which the monitoring is to take place. The signals that are received by the detector units 200 are first intercepted by an acoustic transducer 265 and then pass through an ultrasonic receiver 260 to a data demodulator 230 that comprises a correlator 235 which is fast enough to compare the received signal with all the sequences that are in use in the system.

The correlator 235 produces a result indicating both which sequence was used, i.e., which identification tag was used, and the arrival time of the spectrum sequence. The arrival time is then used in a positioning algorithm which is based on differences in arrival times at the different detector units 200 in a calculation of the position of a particular identification tag.

A detector unit 200 also contains power supply means 250, ultrasonic transmitter 270, and network interface controller 210. The last-mentioned ensures that several detector units 200 can be connected by signals to a central processing unit (FIG. 3) which makes the relevant calculations.

FIG. 3 shows an overview of the whole system 300 according to the invention. The figure shows the interaction between identification tags 100, detector units 200, and a central unit 310 in the form of a PC that coordinates all data received. Several client terminals 320 may also be connected to the system in order to gain access to information from different locations.

For an increased update rate of position determination of identification tags, the system comprises at least one identification tag 100 that transmits a spread spectrum sequence, at least one detector unit 200 that detects the spread spectrum sequence, a network 215 that connects several detector units 200 together by signals, and at least one central unit 310 for collecting and interpreting processed data from the detector units 200. There are also processing means in the central unit 310 for position determination of a specific identification tag 100.

The invention claimed is:

1. A method of identifying tags in an indoor acoustic positioning system comprising identification tags and detector units, for position determination of one or more identification tags characterised in that the method comprises:
   transmitting from an identification tag an acoustic spread spectrum sequence that is unique to the identification tag;
   receiving the spread spectrum sequence in a detector unit and recording an arrival time of the spectrum sequence, and comparing the spectrum sequence with stored values of the spectrum sequences used by all the identification tags in the positioning system.

2. The method according to claim 1, characterised in that it is used within a limited area.

3. The method according to claim 1, characterised in that the frequency of the transmitted acoustic spread spectrum sequence is in the ultrasonic range.

4. The method according to claim 1, further comprising the step of comparing arrival times for the same spectrum sequence recorded by different detector units and, on the basis thereof, calculating the position of the identification tag that transmitted this spectrum sequence.

5. An identification tag for use in an indoor acoustic positioning system for determining the position of the identification tag, characterised in that the identification tag comprises means for transmitting an acoustic spread spectrum sequence.

6. The identification tag according to claim 5, characterised in that the identification tag further comprises one or more of the following units:
   tamper sensor;
   timer;
   movement detector.

7. The identification tag according to claim 6 characterised in that the identification tag further comprises means for initiating the transmission of a signal at a fixed time and/or on activation of the tamper sensor and/or movement detector.

8. A detector unit for use in an indoor acoustic positioning system for determining the position of an identification tag, characterised in that the detector unit comprises means for recording the arrival time of an acoustic spectrum sequence and comparing the spectrum sequence with stored values of the spectrum sequences used by all the identification tags in the positioning system.

9. A system for indoor acoustic positioning, characterised in that the system comprises:
   at least one identification tag that transmits an acoustic spread spectrum sequence;
   at least one detector unit that detects and records the spread spectrum sequence, and its arrival time;
   a network which connects several detector units together by signals;
   at least one central unit for collecting and interpreting processed data from the detector units via the network; and
   processing means in the central unit(s) for determining the position of a specific identification tag.

10. The system according to claim 9, characterised in that it is adapted to be used within a limited area.

11. The system according to claim 9, characterised in that the transmitted spread spectrum sequence has a frequency in the ultrasonic range.

12. A method as claimed in claim 1 further comprising the steps of:
   transmitting from a second identification tag an acoustic spread spectrum sequence that is unique to the second tag;
   receiving the spread spectrum sequence of the second identification tag in the detector unit at the same time as receiving the spread spectrum sequence of the first identification tag and recording the arrival time of the spectrum sequence of the second tag, and comparing the spectrum sequence of the second tag with stored values of the spectrum sequences used by all the identification tags in the positioning system.

13. A method of identifying a tag in an indoor acoustic positioning system having a plurality of detector units and a plurality of identification tags comprising the steps of:
   transmitting from a first identification tag an acoustic spread spectrum signal that is unique to the first tag;
   transmitting from a second identification tag an acoustic spread spectrum signal that is unique to the second tag;
   receiving simultaneously the first and second acoustic spread spectrum signals in a detector unit; and
   comparing the sequences of the received spread spectrum signals with stored values of the spectrum sequences used by all the identification tags in the positioning system.

14. A method as claimed in claim 13 further comprising the step of recording the arrival times of the received spread spectrum signals.

15. A method as claimed in claim 1 further comprising the step of receiving the acoustic spread spectrum signal in a second detector unit.

16. A method as claimed in claim 13 further comprising the step of receiving the acoustic spread spectrum signal of the first tag in a second detector unit.

17. A detector unit for use in an indoor positioning system, the detector unit comprising:
   means for receiving simultaneously a plurality of acoustic signals, each signal having a spread spectrum sequence corresponding to a particular tag; and
   means for identifying the particular identification tag corresponding to each of the received acoustic signals.

* * * * *

UNITED STATES PATENT AND TRADEMARK OFFICE
CERTIFICATE OF CORRECTION

PATENT NO. : 7,336,563 B2
APPLICATION NO. : 11/044193
DATED : February 26, 2008
INVENTOR(S) : Sverre Holm It is certified that error appears in the above-identified patent and that said Letters Patent is hereby corrected as shown below:

Column 2, line 1, please delete "U.S." and insert --Norwegian--
Column 2, line 6, please delete "comprises," and insert --comprises--
Column 2, line 48, please delete "air," and insert --air.--
Column 2, line 58, please delete "than." and insert --than--
Column 5, line 60, please delete "6" and insert --6,--

Signed and Sealed this

First Day of April, 2008

JON W. DUDAS
*Director of the United States Patent and Trademark Office*